(12) United States Patent
Chen

(10) Patent No.: US 9,752,880 B2
(45) Date of Patent: Sep. 5, 2017

(54) OBJECT LINKING METHOD, OBJECT LINKING APPARATUS, AND STORAGE MEDIUM

(71) Applicant: FUJITSU LIMITED, Kawasaki-shi, Kanagawa (JP)

(72) Inventor: Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 14/989,422

(22) Filed: Jan. 6, 2016

(65) Prior Publication Data

US 2016/0202065 A1 Jul. 14, 2016

(30) Foreign Application Priority Data

Jan. 9, 2015 (JP) ................................ 2015-003534

(51) Int. Cl.
*G01C 21/16* (2006.01)
*G06K 9/00* (2006.01)
*G01P 15/02* (2013.01)
*G06T 7/20* (2017.01)

(52) U.S. Cl.
CPC ............ *G01C 21/165* (2013.01); *G01P 15/02* (2013.01); *G06K 9/00335* (2013.01); *G06K 9/00771* (2013.01); *G06T 7/20* (2013.01); *G06T 2207/10016* (2013.01); *G06T 2207/30196* (2013.01); *G06T 2207/30241* (2013.01)

(58) Field of Classification Search
USPC ........................................................ 382/103
See application file for complete search history.

(56) References Cited

U.S. PATENT DOCUMENTS

| 7,929,017 B2* | 4/2011 | Aggarwal | ............. G01S 3/7864 348/169 |
| 8,243,136 B2* | 8/2012 | Aota | ....................... G01S 19/23 348/143 |
| 9,607,652 B2* | 3/2017 | Bose | ..................... G11B 27/031 |

(Continued)

FOREIGN PATENT DOCUMENTS

| JP | 2007-281792 | 10/2007 |
| WO | 2009/113265 | 9/2009 |
| WO | 2012/132285 | 10/2012 |

OTHER PUBLICATIONS

Teixeira et al., Tasking Network CCTV Cameras and Mobile Phones to Identify and Localize Multiple People, ACM 978-1-60558-843—Aug. 10, 2009, pp. 1-10.*

(Continued)

*Primary Examiner* — Ishrat I Sherali
(74) *Attorney, Agent, or Firm* — Fujitsu Patent Center

(57) ABSTRACT

An object linking method including: detecting each first object based on a video image, detecting each second object based on each data measured by each inertial sensor, each first object or each second object having each first state or each second state that is one of states including a moving state and a stopping state, and linking, by a computer, each first object and each second object in one-to-one, based on each first change of each first state and each second change of each second state, wherein when a specified first object of at least one first object is not linked to any of the at least one second object, the specified first object is linked to a virtual second object that is added to the at least one second object.

15 Claims, 14 Drawing Sheets

(56) References Cited

U.S. PATENT DOCUMENTS

| | | |
|---|---|---|
| 2011/0205358 A1 | 8/2011 | Aota et al. |
| 2013/0142384 A1 | 6/2013 | Ofek |
| 2014/0226855 A1* | 8/2014 | Savvides ............ G06K 9/00771 |
| | | 382/103 |
| 2015/0154447 A1* | 6/2015 | Wilson ............... G06K 9/00624 |
| | | 382/103 |

OTHER PUBLICATIONS

Duan et al., Automatic Person Identification in Camera Video by Motion Correlation, Bejing Institute of Technology, 2014, pp. 1-6.*

Yuichi Maki et al, "Localization and Tracking of an Accelerometer in a Camera View Based on Feature Point Tracking", the Society of Instrument and Control Engineers (SICE) Tohoku branch 264th Workshop, Mar. 11, 2011. Partial Translation (10 pages).

Takeshi Iwamoto et al., "ALTI: Design and Implementation of Indoor Location System for Public Spaces", Information Processing Society of Japan (IPSJ) Journal vol. 50 No. 4, pp. 1225-1237, Apr. 2009, English Abstract (13 pages).

Naoka Maruhashi et al., "A Method for Identification of Moving Objects by Integrative Use of a Camera and Accelerometers", IPSJ Special Interest Group (SIG), vol. 2010-UBI-27 No. 10 Jul. 15, 2010, English Abstract (8 pages).

Jun Kawai et al., "The Positioning Method based on the Integration of Video Camera Image and Sensor Data", IPSJ SIG Technical Reports, vol. 2012-GN-82 No. 3, vol. 2012-CDS-3 No. 3, Jan. 19, 2012, English Abstract (7 pages).

EESR—The Extended European Search Report dated May 24, 2016 for European Patent Application No. 15203098.7.

* cited by examiner

| TERMINAL ID \ ACQUISITION TIME | 0 | ... | i | ... | j | ... | t |
|---|---|---|---|---|---|---|---|
| m1 | $o_{m1,0} = 0$ | ... | $o_{m1,i} = 1$ | | | | |
| m2 | | ... | | ... | $o_{m2,j} = 0$ | ... | $o_{m2,t} = 1$ |
| ... | ... | ... | ... | ... | ... | ... | ... |
| mk | | | | | | | $o_{mk,t} = 0$ |

21B

| MOVING LINE ID \ ACQUISITION TIME | 0 | ... | i | ... | j | ... | t |
|---|---|---|---|---|---|---|---|
| h1 | $o_{h1,0} = 0$ | | | | $o_{h1,j} = 1$ | | |
| h2 | | ... | $o_{h2,i} = 0$ | ... | | ... | $o_{h2,t} = 1$ |
| ... | ... | ... | ... | ... | ... | ... | ... |
| hk' | | | | | | | $o_{hk',t} = 0$ |

FIG. 4
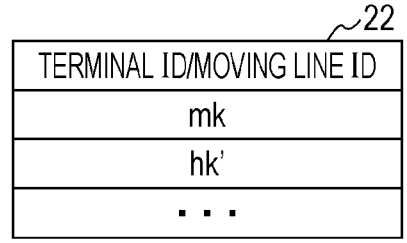
| TERMINAL ID/MOVING LINE ID |
|---|
| mk |
| hk' |
| ... |
FIG. 5
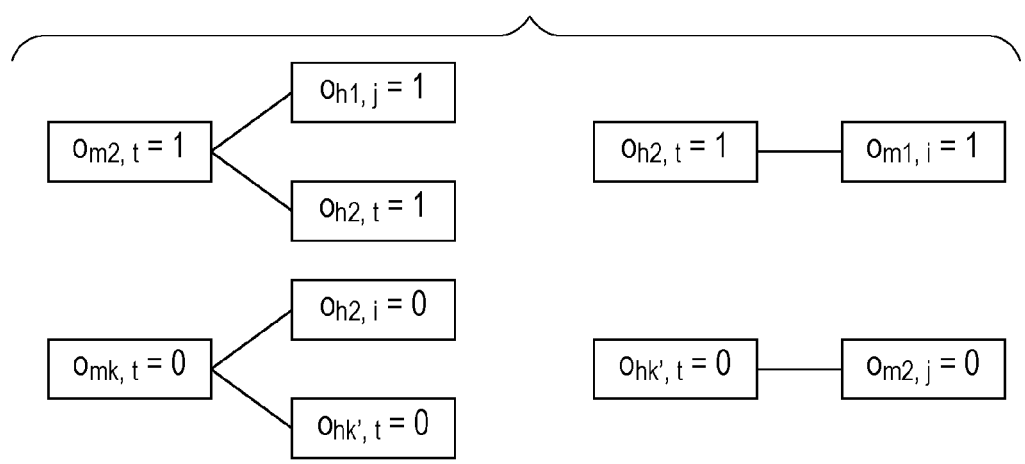
FIG. 6
<CERTAINTY FACTOR MATRIX OF bel($s_t=1$)>
|  | h1 | h2 | h-1 |
|---|---|---|---|
| m1 |  |  |  |
| m-1 |  |  |  |
| m-2 |  |  |  |
EACH ELEMENT MEANS bel($s_t=1$)
<CERTAINTY FACTOR MATRIX OF bel($s_t=0$)>
|  | h1 | h2 | h-1 |
|---|---|---|---|
| m1 |  |  |  |
| m-1 |  |  |  |
| m-2 |  |  |  |
EACH ELEMENT MEANS bel($s_t=0$)

|   |   |   | hk' |   |   |
|---|---|---|---|---|---|
|   |   |   | B |   |   |
|   |   |   | B |   |   |
| mk | C | C | A | C | C |
|   |   |   | B |   |   |
|   |   |   | B |   |   |

FIG. 12

<STOPPING → STOPPING>

| OBJECT (OBSERVATION SENSOR) | EVENT | OBSERVATION PROBABILITY |
|---|---|---|
| MOVING LINE (CAMERA) | STOPPING | 0.1 |
| | MOVING | 0.1 |
| | null | 0.8 |
| PORTABLE TERMINAL (INERTIAL SENSOR) | STOPPING | 0.2 |
| | MOVING | 0.2 |
| | null | 0.6 |

<STOPPING → MOVING>

| OBJECT (OBSERVATION SENSOR) | EVENT | OBSERVATION PROBABILITY |
|---|---|---|
| MOVING LINE (CAMERA) | STOPPING | 0.05 |
| | MOVING | 0.9 |
| | null | 0.05 |
| PORTABLE TERMINAL (INERTIAL SENSOR) | STOPPING | 0.05 |
| | MOVING | 0.8 |
| | null | 0.15 |

<MOVING → MOVING>

| OBJECT (OBSERVATION SENSOR) | EVENT | OBSERVATION PROBABILITY |
|---|---|---|
| MOVING LINE (CAMERA) | STOPPING | 0.05 |
| | MOVING | 0.05 |
| | null | 0.9 |
| PORTABLE TERMINAL (INERTIAL SENSOR) | STOPPING | 0.1 |
| | MOVING | 0.2 |
| | null | 0.7 |

<MOVING → STOPPING>

| OBJECT (OBSERVATION SENSOR) | EVENT | OBSERVATION PROBABILITY |
|---|---|---|
| MOVING LINE (CAMERA) | STOPPING | 0.9 |
| | MOVING | 0.06 |
| | null | 0.04 |
| PORTABLE TERMINAL (INERTIAL SENSOR) | STOPPING | 0.8 |
| | MOVING | 0.05 |
| | null | 0.15 |

FIG. 15

<CASE WHERE STATE EVENT OF PORTABLE TERMINAL IS ACQUIRED>

| ACQUIRED EVENT \ TEMPORARY LINKING $p(r)$ | | MOVING LINE (ACQUISITION TIME $t(n)+r$) | | |
|---|---|---|---|---|
| | | STOPPING ($o_h(r) = 0$) | MOVING ($o_h(r) = 1$) | NO OBSERVATION ($o_h(r)$ = null) |
| PORTABLE TERMINAL (ACQUISITION TIME $t(n)$) | STOPPING ($o_m = 0$) | $N(\bar{r}_{00}, \Sigma_{r_{00}})$ | — | $\dfrac{1.0}{|TW|}$ |
| | MOVING ($o_m = 1$) | — | $N(\bar{r}_{11}, \Sigma_{r_{11}})$ | $\dfrac{1.0}{|TW|}$ |

<CASE WHERE STATE EVENT OF MOVING LINE IS ACQUIRED>

| ACQUIRED EVENT \ TEMPORARY LINKING $p(r)$ | | PORTABLE TERMINAL (ACQUISITION TIME $t(n)+r$) | | |
|---|---|---|---|---|
| | | STOPPING ($o_m(r) = 0$) | MOVING ($o_m(r) = 1$) | NO OBSERVATION ($o_m(r)$ = null) |
| MOVING LINE (ACQUISITION TIME $t(n)$) | STOPPING ($o_h = 0$) | $N(\bar{r}_{00}, \Sigma_{r_{00}})$ | — | $\dfrac{1.0}{|TW|}$ |
| | MOVING ($o_h = 1$) | — | $N(\bar{r}_{11}, \Sigma_{r_{11}})$ | $\dfrac{1.0}{|TW|}$ |

<CERTAINTY FACTOR
MATRIX OF bel($s_t$=1)>

|     | h1 | h2 | h-1 |
| --- | --- | --- | --- |
| m1  |    |    |     |
| m-1 |    |    |     |
| m-2 |    |    |     |

<CERTAINTY FACTOR
MATRIX OF bel($s_t$=0)>

|     | h1 | h2 | h-1 |
| --- | --- | --- | --- |
| m1  |    |    |     |
| m-1 |    |    |     |
| m-2 |    |    |     |

$q = \max_{s_t = 0, 1} bel(s_t)$ $-\log(q)$

<LINKING SCORE MATRIX>

|     | h1 | h2 | h-1 |
| --- | --- | --- | --- |
| m1  |    |    |     |
| m-1 |    |    |     |
| m-2 |    |    |     |

EACH ELEMENT
MEANS $-\log(q)$

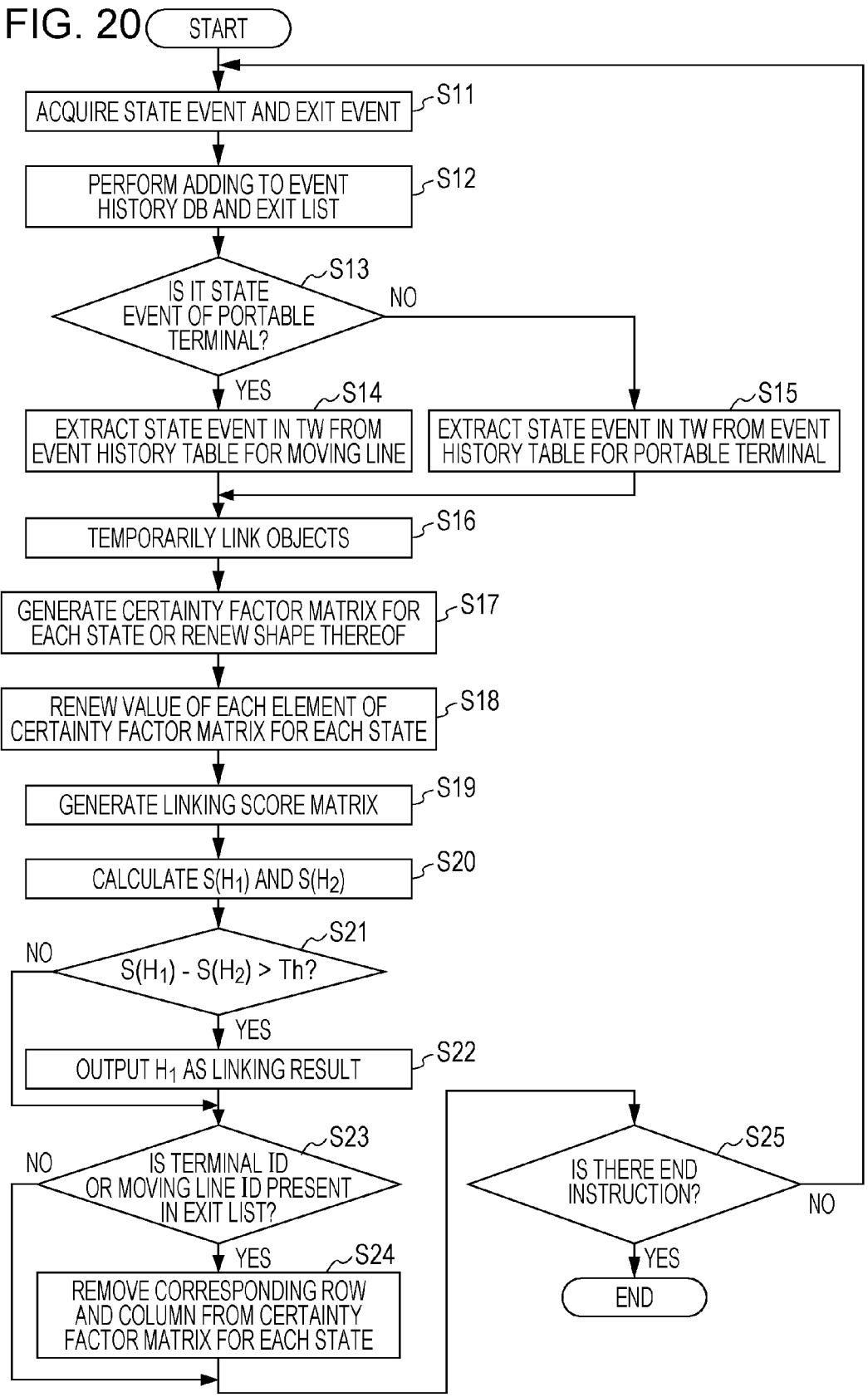

OBJECT LINKING METHOD, OBJECT LINKING APPARATUS, AND STORAGE MEDIUM

CROSS-REFERENCE TO RELATED APPLICATION

This application is based upon and claims the benefit of priority of the prior Japanese Patent Application No. 2015-003534, filed on Jan. 9, 2015, the entire contents of which are incorporated herein by reference.

FIELD

The embodiments discussed herein are related to an object linking method, an object linking apparatus, and a storage medium.

BACKGROUND

Information which specifies a person present in a certain place (region) is useful for providing a service customized for marketing surveys or user preference or needs. In recent years, with development of information and telecommunication infrastructure and sensor networks, spread of portable terminals, or the like, a technology in which personal identification is performed in various ways has been proposed.

For example, a technology in which personal recognition is performed using biological information, such as facial recognition, has been provided. In the personal recognition using such biological information, for example, biological information such as a facial pattern has to be registered, for each user. Therefore, it is difficult to specify a person among targets of unspecified users present in a public place, or the like.

Therefore, today the portable terminals are widely spread and a technology, in which a person present in a predetermined region is specified through linkage between information acquired by a surroundings-side sensor network, which can detect a state of surroundings, and information acquired from a portable terminal which is carried by the person, has been proposed. According to this technology, without performing prior information registration such as registration of biological information such as a facial pattern, it is possible to provide a specific service to the portable terminal which is carried by a specified person.

For example, a technology, in which the localization of an accelerometer within a camera view is performed based on the correlation between acceleration data obtained through tracking feature points extracted from a camera image and acceleration data obtained from a built-in accelerometer in the portable terminal, has been proposed.

In addition, a technology, in which location information of all the users present in the surroundings, which is obtained by a tracking system using a camera, is regularly transmitted to a portable terminal, has been proposed. In this technology, the portable terminal generates a track from continuously received location information, stores the tracks as a symbolized list, continuously estimates a user's walking state from data obtained by a built-in motion sensor in the portable terminal, and stores the state in time series. Also, the portable terminal collates the track and the walking state and specifies a track of the portable terminal user from all of the tracks.

In addition, a technology, in which a motion change of a moving object on a camera image is matched with a motion change obtained from an accelerometer installed on the moving object, and thereby the moving object is identified on the camera image, has been proposed.

In addition, a technique, in which three-dimensional positional data of a subject is obtained by combining a video camera image and data from an accelerometer, has been proposed. In the technique, without performing the integral or differential of data combination from a plurality of sensors, acceleration obtained by a sensor and a speed obtained from differences between frames of camera images are collated and IDs of subjects are collated.

CITATION LIST

Non Patent Literature

NPL1: Yuichi Maki, Shingo Kagami, and Koichi Hashimoto, "Localization and Tracking of an Accelerometer in a Camera View Based on Feature Point Tracking", the Society of Instrument and Control Engineers (SICE) Tohoku branch 264th Workshop, March, 2011.

NPL2: Takeshi Iwamoto, Arei Kobayashi, and Satoshi Nishiyama, "ALTI: Design and Implementation of Indoor Location System for Public Spaces", Information Processing Society of Japan (IPSJ) Journal Vol. 50 No. 4, pp 1225-1237, April, 2009.

NPL3: Naoka Maruhashi, Tsutomu Terada, and Masahiko Tsukamoto, "A Method for Identification of Moving Objects by Integrative Use of a Camera and Accelerometers", IPSJ Special Interest Group (SIG), 2010.

NPL4: Jun Kawai, Junichi Tajima, Shigeo Kaneda, Kimio Shintani, Teiji Emori, and Hirohide Haga, "The Positioning Method based on the Integration of Video Camera Image and Sensor Data", IPSJ SIG Technical Reports, 2012.

SUMMARY

According to an aspect of the invention, an object linking method includes detecting each of at least one first object based on a video image, each of the at least one first object having each first state that is one of states including a moving state and a stopping state, detecting each of at least one second object based on each data measured by each inertial sensor in each of the at least one second object, each of the at least one second object having each second state that is one of states including a moving state and a stopping state, and linking, by a computer, each of the at least one first object and each of the at least one second object in one-to-one, based on each first change of each first state and each second change of each second state, wherein when a specified first object of the at least one first object is not linked to any of the at least one second object, the specified first object is linked to a virtual second object that is added to the at least one second object, and when a specified second object of the at least one second object is not linked to any of the at least one first object, the specified second object is linked to a virtual first object that is added to the at least one first object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of an event history database (DB);

FIG. 4 is a diagram illustrating an example of an exit list;

FIG. 5 is a diagram illustrating extraction of a temporary linking pattern of a state event;

FIG. 6 is a diagram illustrating an example of a certainty matrix;

FIG. 12 is a diagram illustrating an example of an observation probability model;

FIG. 15 is a diagram illustrating an example of an arrival time difference probability model;

FIG. 20 is a flowchart illustrating an example of an object linking process.

DESCRIPTION OF EMBODIMENTS

However, in a technique of the related art, in a case where a person who does not carry a portable terminal is extracted from a camera image, or in a case where a person who carries a portable terminal is not extracted from a camera image, a problem arises in that linking between a person on a camera image and a portable terminal is performed with low accuracy.

An object of the technology of the disclosure, as an aspect, is to improve linking accuracy between different types of objects.

Figure 1:
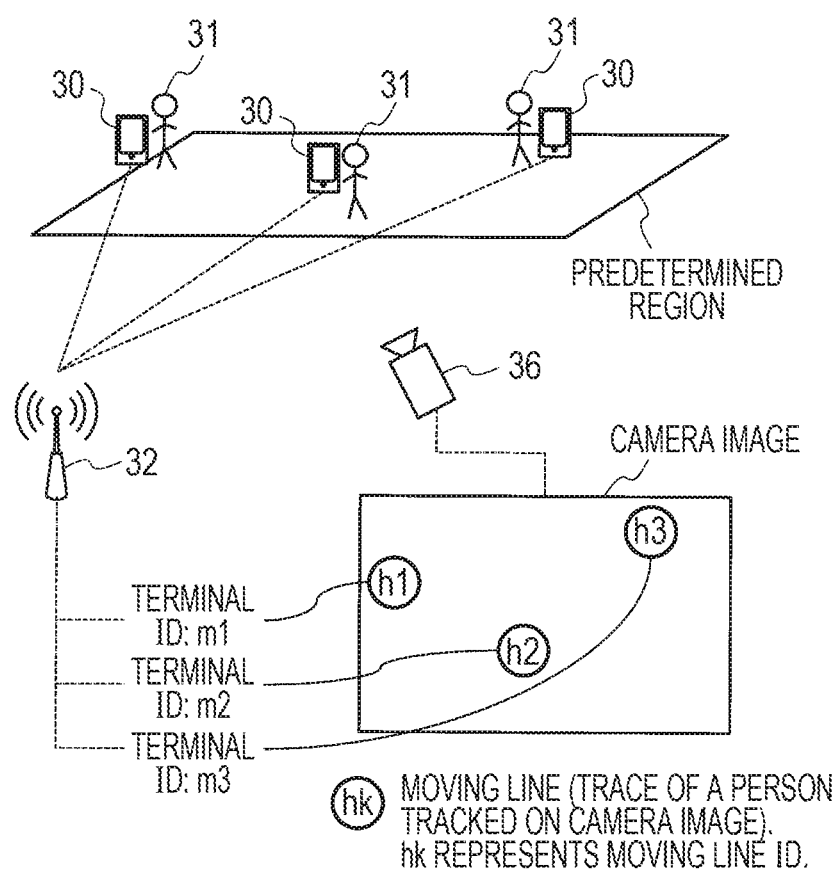
FIG. 1 is a diagram illustrating an outline of this embodiment.

Hereinafter, an example of an embodiment according to the technology of the disclosure will be described in detail with reference to the drawings. In the present embodiment, as illustrated in FIG. 1, a case, where respective moving lines, which are tracked by imaging a person 31 who carries a portable terminal 30 present in a predetermined region, using a camera 36, is linked with recognition information of the portable terminal 30, is described. The moving line will be described below in detail and, in brief, traces of the person 31 tracked on the camera image. Further, the moving line and the portable terminal 30 are examples of an "object" of the technology of the disclosure and the person 31 is an example of a "target" of the technology of the disclosure.

Figure 2:
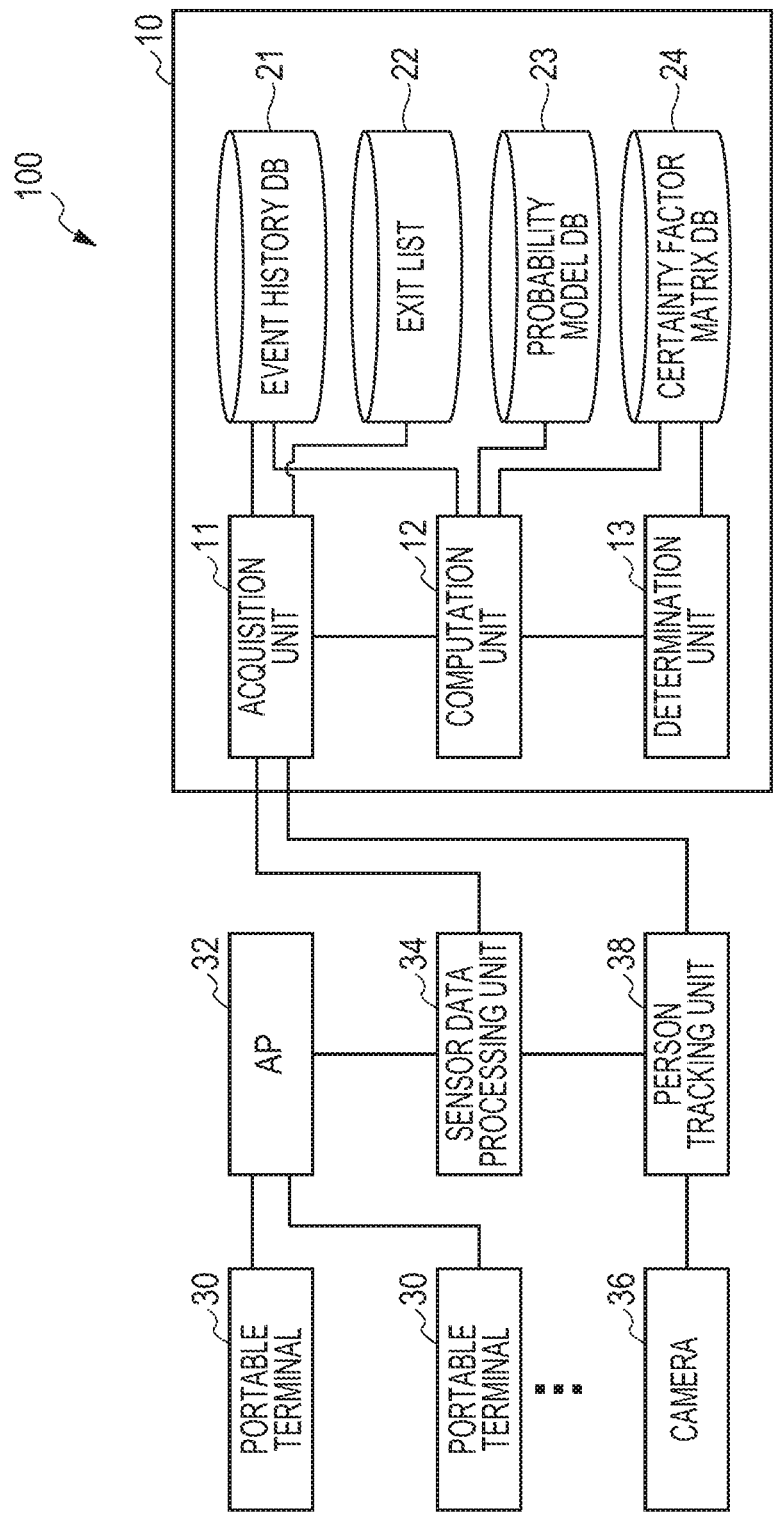
FIG. 2 is a functional block diagram of an object linking system.

As illustrated in FIG. 2, an object linking system 100 includes an object linking apparatus 10, a plurality of portable terminals 30, an access point (AP) 32, a sensor data processing unit 34, a camera 36, and a person tracking unit 38.

The portable terminal 30 is a device such as a mobile phone, a smart phone, or a tablet. In addition, the portable terminal 30 includes an inertial sensor which can detect a state of the person 31 who carries the portable terminal 30. For example, the inertial sensor is an accelerometer, a gyro sensor, or the like.

When the person 31 who carries the portable terminal 30 appears in the predetermined region, the AP 32 is a wireless LAN access point to which the portable terminal 30 is connected. The AP 32 relays communication between the portable terminal 30 and the sensor data processing unit 34 to be described below. Accordingly, it is possible to recognize appearance and exit of the person 31 who carries the portable terminal 30, with respect to the predetermined region, based on a connection state of the portable terminal 30 with the AP 32.

The sensor data processing unit 34 acquires, from the portable terminal 30 through the AP 32, recognition information (hereinafter, referred to as an "terminal ID") of the portable terminal 30 and sensor data detected by the inertial sensor included in the portable terminal 30.

The sensor data processing unit 34 generates a state event indicating the state of the person 31 who carries the portable terminal 30 based on the acquired sensor data. In the present embodiment, as the state of the person 31, both "moving", representing that the person 31 is moving, and "stopping", representing that the person is stopping, are presented. For example, the sensor data processing unit 34 performs observation as "moving" in a case where the sensor data is equal to or greater than a predetermined value, and as "stopping" in a case where the sensor data is equal to or less than the predetermined value. Also, the sensor data processing unit 34 generates a "state event" when the observed state is changed from "stopping" to "moving", or from "moving" to "stopping". For example, in a case where transition from "stopping" to "moving" occurs, the state event can be set to 1 and in a case where transition from "moving" to "stopping" occurs, the state event can be set to 0. Also, the sensor data processing unit 34 transmits, along with the terminal ID of the corresponding portable terminal 30, the generated state event to the object linking apparatus 10.

In addition, the sensor data processing unit 34 generates an "exit event" indicating that the person 31 who carries the portable terminal 30 exits the predetermined region when the portable terminal 30 is disconnected from the AP 32 and transmits, along with the terminal ID, the exit event to the object linking apparatus 10.

The camera 36 images a predetermined region equivalent to the predetermined region in which the appearance and exit of the person 31 who carries the portable terminal 30 can be recognized by the AP 32 and the camera outputs the captured camera image.

The person tracking unit 38 acquires the camera image output from the camera 36, detects a region (set of feature points) indicating the person 31 from each frame of the camera images, acquires positional information on the camera images, and tracks the person 31 on the camera images while the feature points are associated among the frames. Traces obtained by arranging, in time series, the positional information of the region indicating each person 31 detected in each frame on the camera image are referred to as a "moving line". Further, since it is possible to use a known technique in the related art for tracking of the person 31 using the camera image, detailed description is omitted. The person tracking unit 38 assigns a moving line ID which is recognition information with respect to a moving line obtained by tracking the region in a case where a region indicating the person 31 who becomes a tracking target newly appears on the camera image.

In addition, the person tracking unit 38 generates a state event indicating a state of the person 31 corresponding to the moving line based on a tracking result of the person 31. Similar to the description above, the state includes both "moving" and "stopping". The person tracking unit 38 performs observation of "moving" in a case where an amount of change in the positional information in each frame of the camera image is equal to or greater than the predetermined value and of "stopping" in a case where an amount of change in the moving line is equal to or less than the predetermined value. The person tracking unit 38 generates a "state event" when the recognized state is changed from "stopping" to "moving", or from "moving" to "stopping". For example, in a case where the state changes from "stopping" to "moving", the state event can be set to 1 and in a case where the state changes from "moving" to "stopping", the state event can be set to 0. Also, the person tracking unit 38 transmits, along with the moving line ID of the corresponding moving line, the generated state event to the object linking apparatus 10.

Further, the person tracking unit 38 generates an "exit event" indicating that the person 31 corresponding to the moving line, for which it is not possible to track, exits the predetermined region when it is not possible for the region indicating the person 31 on the camera image to be tracked and the person tracking unit transmits, along with the moving line ID, the exit event to the object linking apparatus 10.

As illustrated in FIG. 2, the object linking apparatus 10 includes an acquisition unit 11, a computation unit 12, and a determination unit 13, as functional sections. In addition, in a predetermined storage region of the object linking apparatus 10, an event history database (DB) 21, an exit list 22, a probability model DB 23, and a certainty factor matrix DB 24 are stored.

The acquisition unit 11 acquires the state event and the exit event transmitted from the sensor data processing unit 34 and the person tracking unit 38, respectively. The acquisition unit 11 stores the acquired state event in the event history DB 21 for each type of objects from which the state event is observed.

FIG. 3 illustrates an example of the event history DB 21. In the present embodiment, two types of objects of the portable terminal 30 and the moving line are presented. Therefore, as illustrated in FIG. 3, the event history table 21A for the portable terminal 30 and an event history table 21B for the moving line are contained in the event history DB 21. In the event history tables 21A and 21B, values of the state events associated with acquisition time points are stored for each terminal ID or each moving line ID acquired along with the state event. The acquisition unit 11 adds a row to the event history tables 21A and 21B in a case where a state event along with a new terminal ID or a new moving line ID. In addition, the values of the state event maintained in the event history tables 21A and 21B are for only history within a certain period of time and a column having an acquisition time point after the certain period of time is removed.

Hereinafter, a state event obtained by the acquisition unit 11 at a time point t when the terminal ID or the moving line ID is generated from an object of "x" is written as "$o_{x,t}$" and, in a case where the time point t is not desired in description, the state event is written as "$o_x$". In addition, in the present embodiment, the terminals ID are represented by m1, m2, . . . , and mk and the moving lines ID are represented by h1, h2, . . . , and hk'.

In addition, the acquisition unit 11 stores, along with the exit event, the terminal ID or the moving line ID in the exit list 22 as illustrated in FIG. 4 when the exit event is acquired from the sensor data processing unit 34 or the person tracking unit 38.

The computation unit 12 temporarily links the state event (hereinafter, referred to as the "state event of the portable terminal 30") observed from the portable terminal 30 with the state event (hereinafter, referred to as the "state event of the moving line") observed from moving line, with reference to the event history tables 21A and 21B. Specifically, the computation unit 12 extracts a state event having the same value as that of the state event of the portable terminal 30, of the state event of the moving line acquired in a time window of the acquisition time point t in a case where the state event of the portable terminal 30 is acquired at the acquisition time point t. Similarly, the computation unit 12 extracts a state event having the same value as that of the state event of the moving line, of the state event of the portable terminal 30 acquired in the time window of the acquisition time point t in a case where the state event of the moving line is acquired at the acquisition time point t. Further, the time window of the acquisition time point t is a predetermined period including the acquisition time point t, and here is a period from the acquisition time point t to a predetermined time.

For example, a case where the temporary linking for the state event acquired at the acquisition time point t is performed is described with reference to the event history tables 21A and 21B illustrated in FIG. 3. Further, the time window TW of the acquisition time point t is a period of 0<TW≤t. As illustrated in the event history table 21A in FIG. 3, state events of the portable terminal 30 at the acquisition time point t are acquired as $o_{m2,t}=1$ and $o_{mk,t}=0$. As a state event of $o_{m2,t}=1$ of a temporary linking target, state events of the moving line of $o_{h1,j}=1$ and $o_{h2,t}=1$ are extracted from the event history table 21B. Similarly, as a state event of a temporary linking target of $o_{mk,t}=0$, state events of the moving line of $o_{h2,j}=0$ and $o_{hk',t}=0$ are extracted from the event history table 21B.

In addition, as illustrated in the event history table 21B in FIG. 3, state events of the moving line are acquired as $o_{h2,t}=1$ and $o_{hk',t}=0$. As a state event of $o_{h2,t}=1$ of a temporary linking target, state events of the portable terminal 30 of $o_{m1,t}=1$ and $o_{m2,t}=1$ are extracted from the event history table 21A. Similarly, as a state event of a temporary linking target of $o_{hk',t}=0$, state events of the portable terminal 30 of $o_{m2,j}=0$ and $o_{mk,t}=0$ are extracted from the event history table 21A.

As a result, as illustrated in FIG. 5, a temporary linking pattern between the state event of the portable terminal 30 and the state event of the moving line is extracted. Further, for the duplicative patterns, one remains and the other is removed. In addition, in a case where a state event of one type of object having the same value as that of the state event of another type of object is not present in the time window, temporary linking to a "null" event indicating that there is no observation of a corresponding state event (namely, indicating that a corresponding state event is undetected) is performed.

In addition, the computation unit 12 computes a linking degree indicating the probability that linking between the objects from which temporarily linked state events are observed is correct. When the linking between the objects is correct, the person 31 corresponding to each object (portable terminal 30 and the moving line) is the same person. The higher the probability that the person 31 corresponding to each object is the same person, the higher the linking degree. In the present embodiment, a certainty factor that the person 31 corresponding to each object has each state is computed when a state event is acquired, based on the acquired state event, the temporarily linked state event, and a probability model prepared in advance. The certainty factor is used as the linking degree. Here, each state means "moving" or "stopping".

Specifically, as illustrated in FIG. 6, with a square matrix, in which one type of object corresponds to a row and another type of object corresponds to a column, as a certainty factor matrix, the computation unit 12 generates the certainty factor matrix for each type of states and stores the certainty factor matrix in the certainty factor matrix DB 24. Also, the computation unit 12 computes a value of each element in the square matrix as a certainty factor which is the linking degree of a set of the objects of rows and columns corresponding to each element. Further, in FIG. 6, $s_t$ is an estimated value of a state of the person 31 at the time point t and bel($s_t$=x) is a certainty factor in which the state of the person 31 is "x". In addition, $s_t$=1 represents the state of "moving" and $s_t$=0 represents the state of "stopping". In addition, in FIG. 6, "m $^-$1" represents a virtual object generated by virtually corresponding to an object h1. The virtual object will be described below.

First, renewal of the generation and shape of the certainty factor matrix is described.

Specifically, the computation unit 12 makes the certainty factor matrix for each state empty as an initial setting. Also, a state event is acquired for the first time at time point i and a temporary linking pattern of $\{o_{hk',i}, o_{mk,i}\}$ is extracted. In this case, as illustrated on the upper stage in FIG. 7, the computation unit 12 generates a matrix of one row and one column in which hk' represents a column and mk or the like represents the column. The value of an element of a matrix is set to "1.0" as an initial value.

Here, a case, where the person 31 who appears in the predetermined region does not carry the portable terminal 30, or a case, where the inertial sensor is not installed on the portable terminal 30, is assumed. In addition, the person 31 present in the predetermined region appears at a dead spot of the camera 36 and the moving line is not extracted on the camera image. In other words, the state event of the portable terminal 30 is observed; however, the state event of the corresponding moving line is not observed. Otherwise, the state event of the moving line is observed; however, the state event of the corresponding portable terminal 30 is not observed. In such a case, when the linking of only the objects which correspond to the observed state event, only the temporary linking pattern without containing the right linking pattern is extracted, and the final linking is performed with low accuracy.

Figure 7:
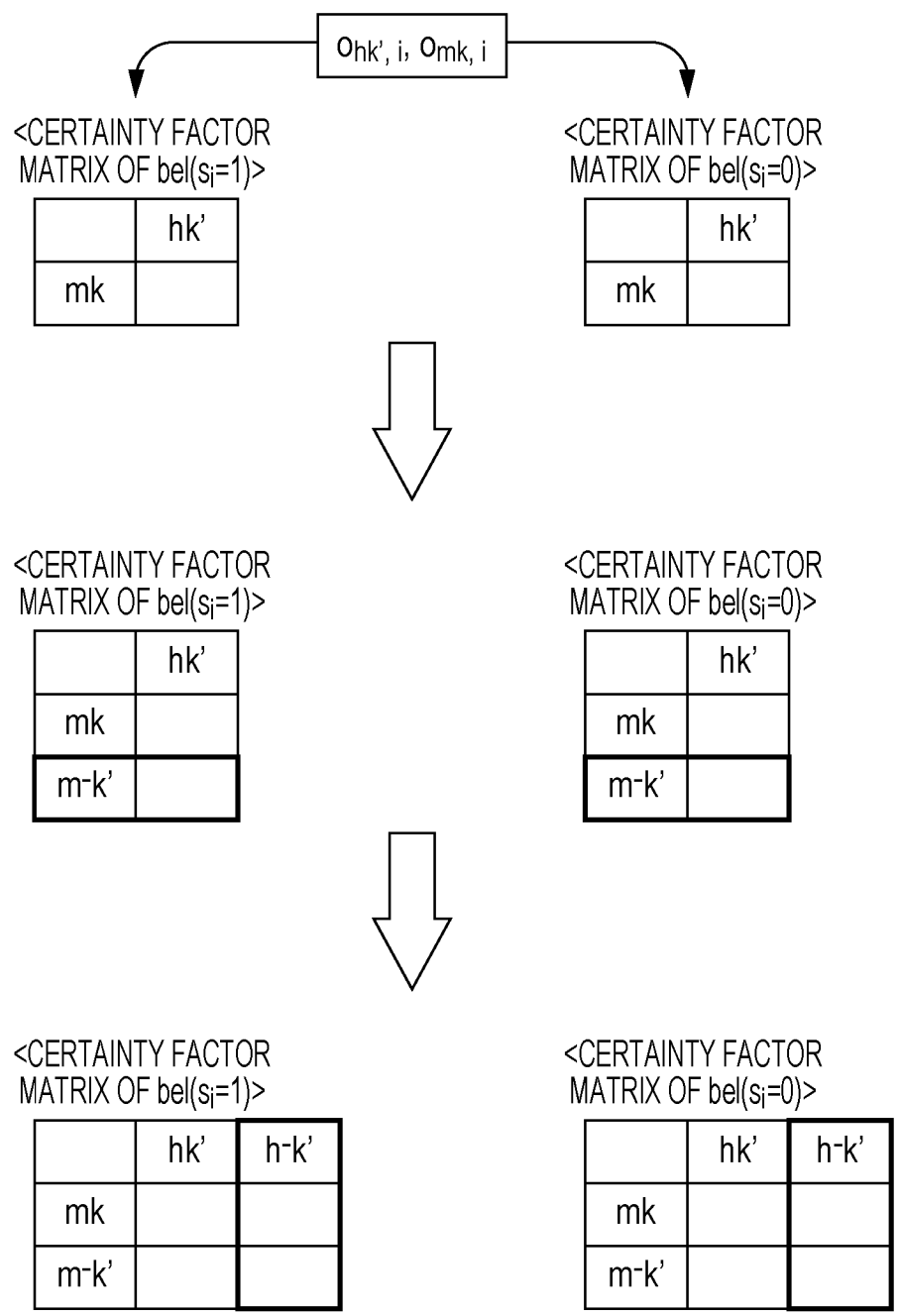
FIG. 7 is a diagram illustrating generation of a certainty matrix.

Therefore, as illustrated on the middle stage in FIG. 7, the computation unit 12 adds a virtual object, which virtually corresponds to the object added in a column, to a row. Similarly, as illustrated on the lower stage in FIG. 7, the computation unit 12 adds a virtual object, which virtually corresponds to the object added in a row, to a column. In this manner, introduction of the virtual object to both the rows and the columns enables the certainty factor matrix to be maintained as the square matrix. The certainty factor matrix is the square matrix, and thereby it is possible to link between different types of objects under a restraint condition that one-to-one linking is performed on one type of object with another type of object.

In addition, in a state in which the certainty factor matrix is not empty, a state event is acquired at a certain time point j and a temporary linking pattern of $\{o_{h1,j}, o_{mk,j}\}$ is extracted. In this case, the computation unit 12 adds a row or a column according to the type of object in a case where a new object which is not present in the certainty factor matrix is extracted. Here, the certainty factor matrix before renewal has a state illustrated in a view on the lower stage in FIG. 7. As illustrated in a view on the left in FIG. 8, since mk is present in the row but h1 is not present in the column, the computation unit 12 adds a column h1 to the certainty factor matrix. In addition, the computation unit 12 also adds a virtual object corresponding to the newly added object to a row or a column. Here, as illustrated in a view on the right in FIG. 8, the computation unit 12 adds a row of m $^-$1 to the certainty factor matrix.

Next, computation of the value for each element of the certainty factor matrix, that is, a certainty factor, will be described. The computation unit 12 renews the certainty factor whenever a state event is acquired. In a case where the temporary linking pattern is $\{o_{hk'}, o_{mk}\}$, the element of the certainty factor matrix, which becomes a renewal target, is an element represented by "A" of the certainty factor matrix illustrated in FIG. 9. Further, in a case where the temporary linking pattern is $\{o_{hk'}, \text{null}\}$, the elements as a renewal target are elements represented by "A" and "B" of the certainty factor matrix illustrated in FIG. 9. Furthermore, in a case where the temporary linking pattern is $\{\text{null}, o_{mk}\}$, the elements as a renewal target are elements represented by "A" and "C" of the certainty factor matrix illustrated in FIG. 9.

The computation unit 12 computes a certainty factor bel($s_{t(n)}$) based on the acquired state event, a state transition probability model 23A, an observation probability model 23B, and an arrival time difference probability model 23C stored in the probability model DB 23. Specifically, as will be described below, the certainty factor bel($s_{t(n)}$) is computed through state estimation using a Bayesian filter.

First, a certainty factor bel($\overline{s}_{t(n)}$) with respect to a predicting state $\overline{s}_{t(n)}$ at this time (n) is obtained by a predicting expression to be exhibited in the following Expression (1). The predicting expression of Expression (1) is an expression in which, when the state event in the previous time (n−1) is acquired, a state transition probability $p(s_{t(n)}|s_{t(n-1)})$ is multiplied to a renewed certainty factor bel($s_{t(n-1)}$) and the certainty factor bel($\overline{s}_{t(n)}$) is predicted. Further, n represents the number of times of acquisition of the state event and t(n) is an acquisition time of an n-th state event. In addition, $\overline{s}_{t(n)}$ is written with an overline ("¯") assigned on a characteristic ("$s_{t(n)}$") in the expression.

$$bel(\overline{s_{t(n)}}) = \Sigma_{s_{t(n-1)}=0}^{1} p(s_{t(n)}|s_{t(n-1)}) bel(s_{t(n-1)}) \quad (1)$$

In addition, a renewal expression using the state event acquired (observed) this time is the following Expression (2).

$$bel(s_{t(n)}) = \eta p(o_h, o_m(r)|s_{t(n-1)} \to s_{t(n)}) bel(\overline{s_{t(n)}}) \quad (2)$$

An integrating expression which integrates the predicting expression exhibited in Expression (1) which is substituted with the renewal expression exhibited in Expression (2) is exhibited in the following Expression (3).

$$bel(s_{t(n)}) = \eta p(r) p(o_h|s_{t(n-1)}=0 \to s_{t(n)}) p(o_m|s_{t(n-1)}=0 \to s_{t(n)}) p(s_{t(n)}|s_{t(n-1)}=0) bel(s_{t(n-1)}=0) + \eta p(r) p(o_h|s_{t(n-1)}=1 \to s_{t(n)}) p(o_m|s_{t(n-1)}=1 \to s_{t(n)}) p(s_{t(n)}|s_{t(n-1)}=1) bel(s_{t(n-1)}=1) \quad (3)$$

The integrating expression exhibited in the Expression (3) is the certainty factor with respect to a state $s_{t(n)}$ of the person 31 at a time point t(n). In addition, η represents a normalization factor and p(r) represents the probability obtained from the arrival time difference probability model 23C. In addition, $p(o_{h(or\ m)}|s_{t(n-1)}=0\ (or\ 1)\rightarrow s_{t(n)})$ is the probability obtained from the observation probability model 23B and the probability that the state event $o_{h(or\ m)}$ is observed when transition of the state of the person 31 to $s_{t(n)}$ from $s_{t(n-1)}$ is performed. In addition, $p(s_{t(n)}|s_{t(n-1)}=0\ (or\ 1))$ is the probability obtained from the state transition probability model 23A and the probability that transition of the state of the person 31 to $s_{t(n)}$ from $s_{t(n-1)}$ is performed. In addition, $bel(s_{t(n-1)}=0\ (or\ 1))$ is a certainty factor with respect to the state $s_{t(n-1)}$ of the person 31, which is renewed in the previous time. Hereinafter, the probability models included in the probability model DB 23 will be described.

Figure 10:
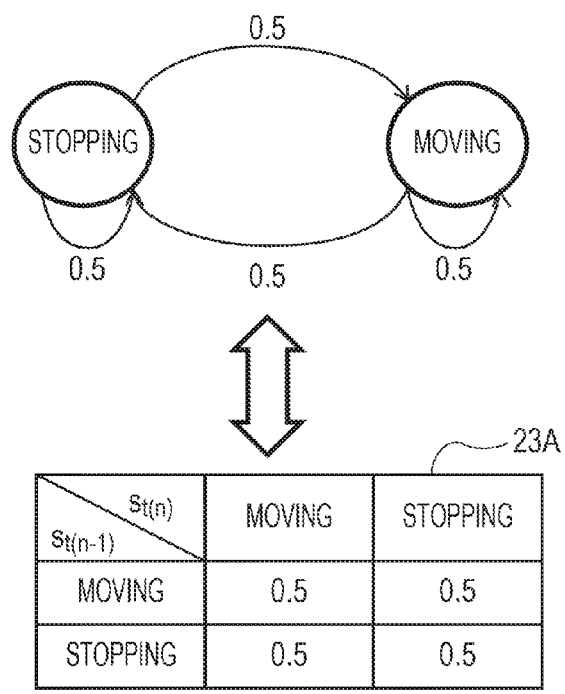
FIG. 10 is a diagram illustrating an example of a state transition probability model.

First, the state transition probability model 23A is described. It is not possible for the computation unit 12 to directly observe a current state of the person 31. Therefore, the computation unit 12 estimates the current state of the person 31, based on the state event of the object. In the present embodiment, since two states ("moving" and "stopping") are presented, the state transition is subjected to modeling as illustrated in FIG. 10. The upper view in FIG. 10 is a conceptual view of the state transition probability model 23A and a circled symbol indicates a state and an arrow between the states indicates state transition. A state on the start side of the arrow is the state $s_{t(n-1)}$ estimated at the previous time and a state on the end side of the arrow is the (subsequent) state $s_{t(n)}$ estimated this time. In addition, a numerical value written by the arrow represents a state transition probability. Here, since whether the person 31 continues the state or whether the person 31 changes to another state, which depends on the intension of the person 31 and the state transition probability becomes uniform. For example, in a case where the state estimated this time is "stopping", the probability that the state is "moving" this time is 0.5 (50%) and the probability that the state is "stopping" this time is 0.5. Further, the state transition probability may set different probabilities.

For example, as illustrated in FIG. 10, in the probability model DB 23, the state transition probability model 23A is stored in a type of table in which the state transition probability is a parameter. A pattern of the state transition probability model 23A is used as $p(st(n)|s_{t(n-1)}=0\ (or\ 1))$ in Expression (3).

Next, the observation probability model 23B is described. In the present embodiment, the state event is generated when the observation on the object is changed. However, there is a possibility that a state event is generated in a case where transition of the state of the person 31 is not performed or a state event is not generated even when the transition of the state is performed, due to an error in sensor observation. In the observation probability model 23B, in consideration of the mistake of the observation of such a sensor, certainty of the acquired (observed) state event is subjected to modeling.

Figure 11:
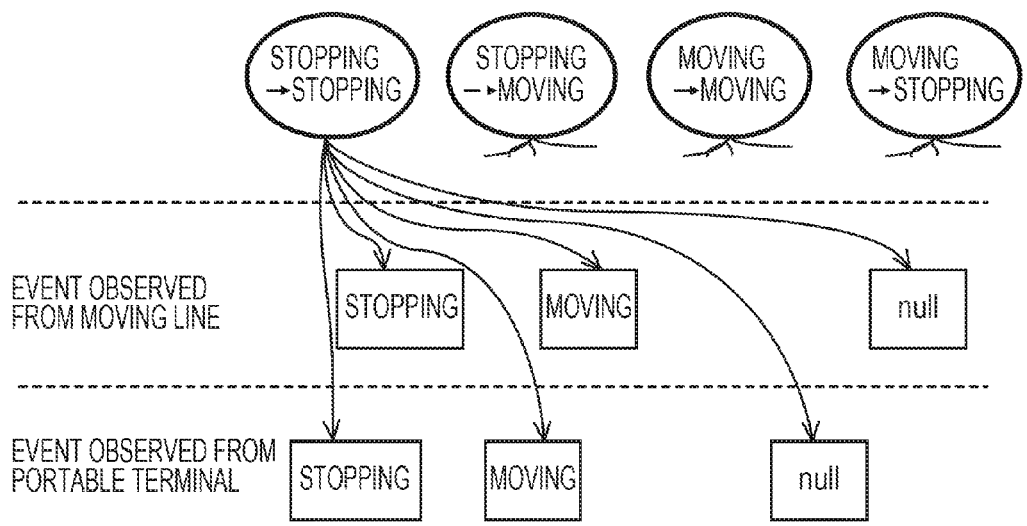
FIG. 11 is a conceptual diagram of an observation probability model.

FIG. 11 illustrates a conceptual view of the observation probability model 23B. When it is considered that the "null" event indicating that there is no observation of a state event is included, state events which are observed from each of the portable terminal 30 and the moving line includes "state event=0 (stopping)", "state event=1 (moving)", and "null". In a case where the transition of the state of the person 31 is performed from "stopping" to "moving", the probability that "state event=1 (moving)" is observed is highest and, and in a case where the transition of the state is performed from "moving" to "stopping", the probability that "state event=0 (stopping)" is observed is highest. In addition, in a case where the state of the person 31 is not changed, the probability that "null" event is observed is highest. The observation probability model 23B determines, as a parameter, the probability (observation probability) that the respective events of "state event=0 (stopping)", "state event=1 (moving), and "null" are observed.

Further, even in a case where it is not possible to observe a state event, using the "null" event, it is possible to probabilistically estimate a state using the observation probability model 23B.

It is possible to acquire the parameter of the observation probability model 23B through operational study. For example, when the person 31 (1) continues the state of "stopping", (2) transitions from "stopping" to "moving", (3) continues the state of "moving", and (4) transitions from "moving" to "stopping", the state events of the respective objects (portable terminal 30 and the moving line) are observed. Also, the respective frequencies of the events of "state event=0 (stopping)", "state event=1 (moving)", and "null", which are observed from the respective objects, are obtained, and it is possible to set the parameters.

For example, as illustrated in FIG. 12, the observation probability model 23B is stored in the probability model DB 23 in a type of table in which the observation probability is the parameter. The parameter of the observation probability model 23B is used as $p(o_{h(or\ m)}|s_{t(n-1)}=0\ (or\ 1)\rightarrow s_{t(n)})$ in Expression (3). Further, a value of the observation probability model 23B in FIG. 12 is an example. Since there is a possibility that the built-in inertial sensor in the portable terminal 30 detects fine movement even when the person 31 stops, in an example in FIG. 12, the observation probability of the state event observed from the moving line is lower than the observation probability of the state event observed from the portable terminal 30.

Figure 13:
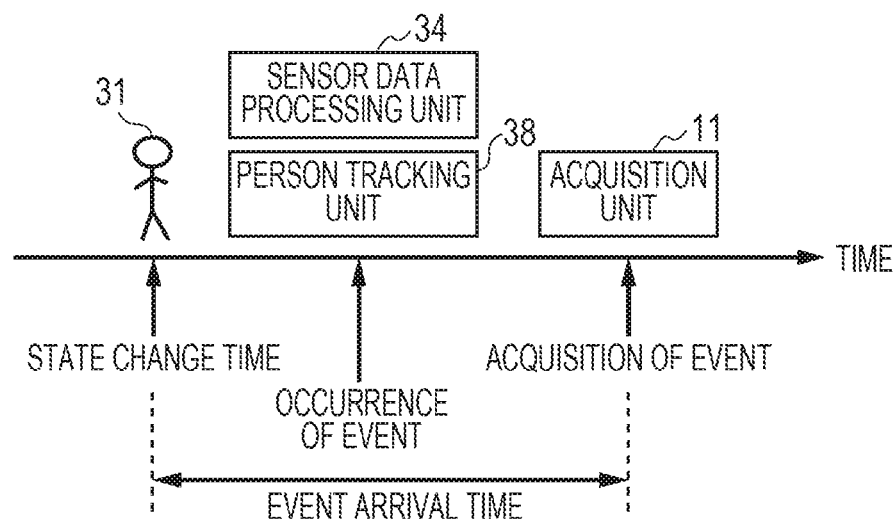
FIG. 13 is a diagram illustrating an event arrival time.

Lastly, the arrival time difference probability model 23C is described. As illustrated in FIG. 13, a period of time from a time point at which the person 31 changes a state to a time point at which the state event is acquired by the acquisition unit 11 is referred to as an event arrival time. Further, since it is difficult to match all the time points of the sensor data processing unit 34 that generates the state event and the person tracking unit 38, a relative time difference of the event arrival is used.

Figure 14:
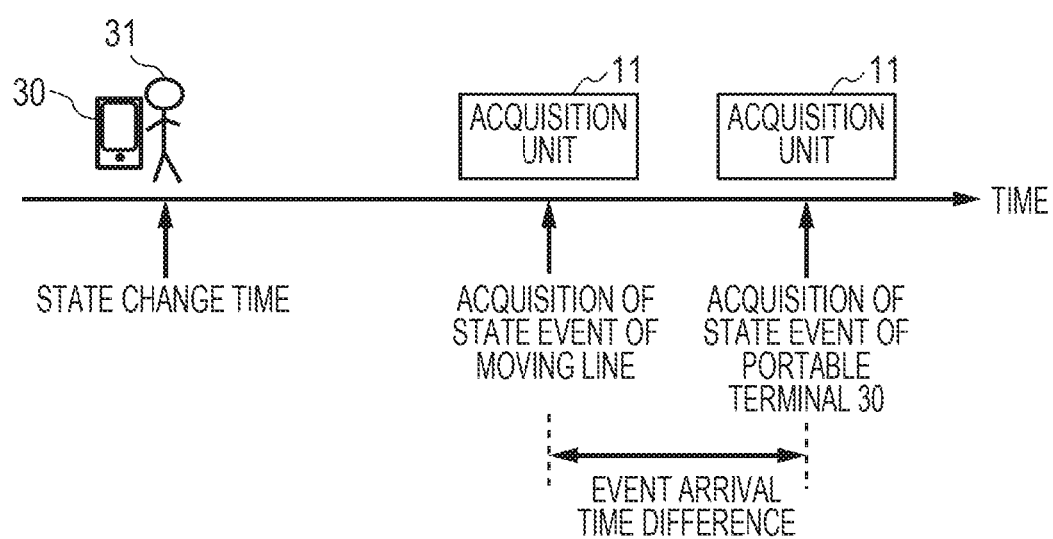
FIG. 14 is a diagram illustrating an event arrival time difference.

As illustrated in FIG. 14, in the present embodiment, a time difference between a time point at which a state event of one type of object is acquired by the acquisition unit 11 and a time point at which the state event of another type of object is acquired by the acquisition unit 11 is referred to as an "event arrival time difference". In the present embodiment, since the objects are the portable terminal 30 and the moving line, the difference between acquisition time points of the state event observed from the portable terminal 30 and the state event observed from the moving line is the event arrival time difference. The event arrival time difference is influenced by an element such as a speed of response after the person 31 changes the state until the respective state events of the sensor data processing unit 34 and the person tracking unit 38 are generated. In addition, the event arrival time difference is influenced by an element such as network traffic between the respective sensor data processing unit 34 and the person tracking unit 38, and the object linking apparatus 10. It is possible to acquire influences by such elements through operational study.

The arrival time difference probability model 23C performs modeling of the probability that the event arrival time difference described above is r. Specifically, an acquisition time point of the state event $o_h$ of the moving line is t(n−1) and an acquisition time point of the state event $o_m$ of the portable terminal 30 is t(n−1)+r. Further, in a case where r is negative, this means that the time tracks back. In other words, this indicates that the state event $o_m$ is first acquired, and then the state event $o_h$ is acquired. Also, using the observation probability of the state event $o_h$ represented by the following Expression (4) and the observation probability of the state event $o_m$ represented by the following Expression (5), Gaussian modeling is performed on the probability p(r) that the event arrival time difference is r, as will be exhibited in the following expressions (6) and (7). Using the observation probability of the state event $o_h$ and the observation probability of the state event $o_m$, it is possible to perform modeling of the probability p(r) in consideration of not only the event arrival time difference but also the certainty of the respective state events.

$$p(o_h|s_{t(n-1)}) \quad (4)$$

$$p(o_m(r)|s_{t(n-1)+r}) \quad (5)$$

$$p(o_h, o_m(r)|s_{t(n)}) = p(r)p(o_h|s_{t(n)})p(o_m|s_{t(n)}) \quad (6)$$

$$p(r) = N(\bar{r}, \Sigma_r) \quad (7)$$

Further, $\bar{r}$ (in the expression, written by attaching an overline ("‾") over the character ("r")) means an average of the event arrival time difference r and $\Sigma_r$ is dispersion of the event arrival time difference r. The arrival time difference probability model 23C determines the probability p(r) as a parameter for each combination of the respective values of the state events acquired by the acquisition unit 11 and the respective values of the state events linked with the state events or the "null" event.

For example, as illustrated in FIG. 15, the arrival time difference probability model 23C is stored in the probability model DB 23 in a type of table in which the probability p(r) that the event arrival time difference is r is a parameter. The parameter of the observation probability model 23B is used as the p(r) in Expression (3). Further, $\bar{r}_{ii}$ represents an average of the event arrival time differences r in a case where the values of the acquired state event of the type of object and the temporarily linked state event of another type of object are "i" and $\Sigma_{rii}$ represents dispersion. In addition, in an example of FIG. 15, in a case where the temporarily linked state event is the "null" event, the event arrival time difference r is assumed to be uniformly distributed within the time window (TW). |TW| is the size of the time window. In this manner, even in the case where non-observation of the state event is performed, it is possible to estimate a state by using the "null" event and probabilistically reflecting the event arrival time difference.

Figure 16:
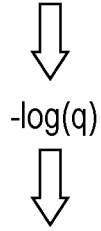
FIG. 16 is a diagram illustrating generation of a linking score matrix.

As illustrated in FIG. 16, the determination unit 13 compares the values (certainty factors) of the elements in the same row and column from the certainty factor matrix for each state, picks out a greater value, and converts the value to a negative opposite. The determination unit 13 sets the converted value as a linking score and puts the value in each element of the same row and column of the linking score matrix. The linking score matrix is stored in the certainty factor matrix DB 24.

In addition, the determination unit 13 performs one-to-one linking between the object (portable terminal 30) corresponding to a row and the object (moving line) corresponding to a column of the linking score matrix. Also, the determination unit 13 obtains the sum of the linking scores for each combination (being each combination candidate) of the linking, combines the linking having the greatest sum of the linking scores, and extracts the combination of the second greatest linking. For example, it is possible to extract two combinations using a K-best method. Also, the determination unit 13 determines, as the linking result, the combination of the linking having the greatest sum of the linking score in a case where the difference between the greatest sum and second greatest sum of the linking scores is equal to or higher than a threshold value.

For example, the combination of the linking having the greatest sum of the linking scores from the linking score matrix illustrated in FIG. 16 is $H_1=\{m1-h1, m^{-1}-h2, m^{-2}-h^{-1}\}$ and the sum of the linking scores at this time is $S(H_1)$. In addition, the combination of the linking having the second greatest sum of the linking scores is $H_2=\{m1-h2, m^{-1}-h1, m^{-2}-h^{-1}\}$ and the sum of the linking scores at this time is $S(H_2)$. The determination unit 13 outputs $h_1$ in a case of $S(H_1)-S(H_2)>Th$ (threshold value). Further, the combination such as $\{m1-h1, m1-h2, m^{-2}-h^{-1}\}$ is not employed because the restraint condition of one-to-one linking between the one type of object and another type of object is violated.

Further, the determination method of the linking result is not limited to the example described above but may determine the linking result through optimization using the linking score. For example, in the case where the combination of the linking having the greatest sum of the linking scores may be used as the linking result or the combination of the linking having the greatest sum of the linking scores may be used as the linking result in a case where the maximum value of the sum of the linking scores is equal to or greater than a predetermined value.

Figure 17:
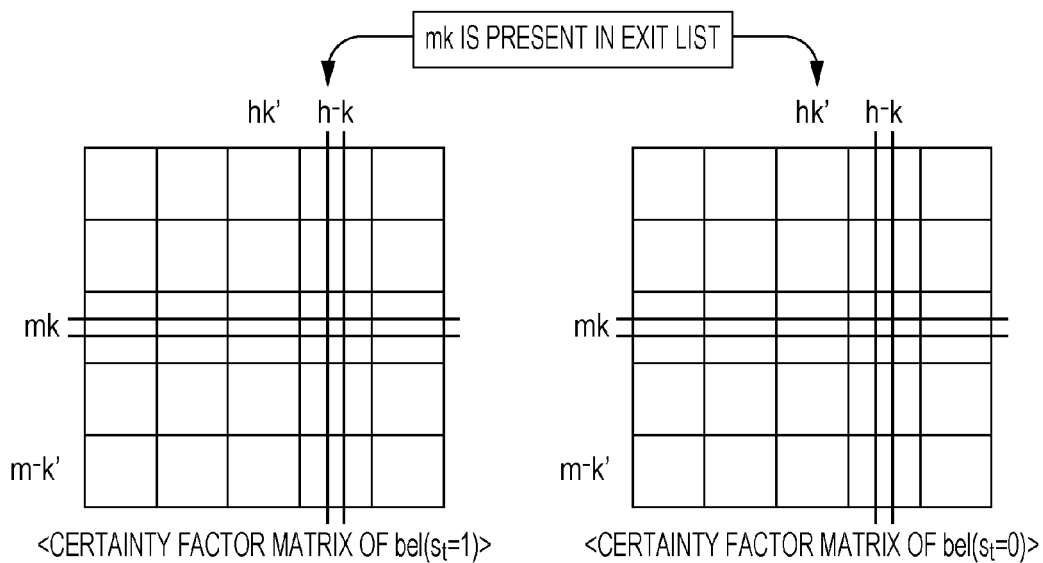
FIG. 17 is a diagram illustrating removal of a row and a column of the certainty matrix, based on the exit list.
Figure 18:
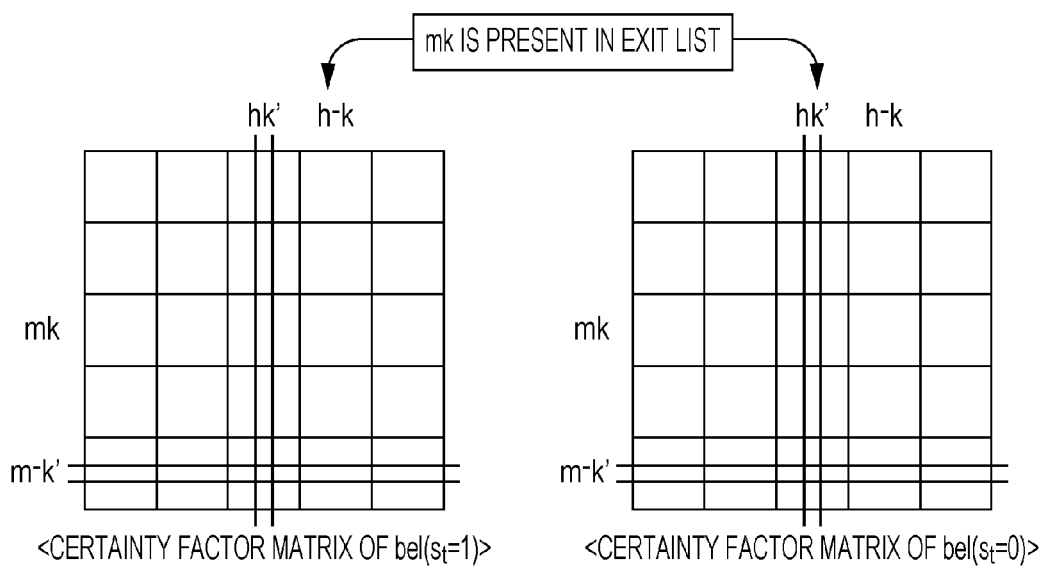
FIG. 18 is a diagram illustrating removal of a row and a column of the certainty matrix, based on the exit list.

In addition, with reference to the exit list 22, the determination unit 13 removes the portable terminal 30 which exits the predetermined region or the moving line for which it is not possible to perform tracking (namely, the subject which has become undetected), a row and column of the certainty factor matrix corresponding to the virtual object generated to correspond to the portable terminal and the moving line. For example, in a case where terminal ID=mk is stored in the exit list 22, the determination unit 13 removes a row of mk from the respective certainty factor matrixes for each state and removes a column of h⁻k which is the virtual object with respect to mk, as illustrated in FIG. 17. In addition, in a case where moving line ID=hk' is stored in the exit list 22, the determination unit 13 removes a column of hk' from the respective certainty factor matrixes for each state and removes a row of m⁻k' which is the virtual object with respect to hk', as illustrated in FIG. 18. In addition, the determination unit 13 removes the terminal ID or the moving line ID from which the row and column of the certainty factor matrix are removed, from the exit list 22. Next, when the state event is acquired, unnecessary calculation of the certainty factor is not executed. Therefore, it is possible to maintain a processing speed so as not to be lowered.

Figure 19:
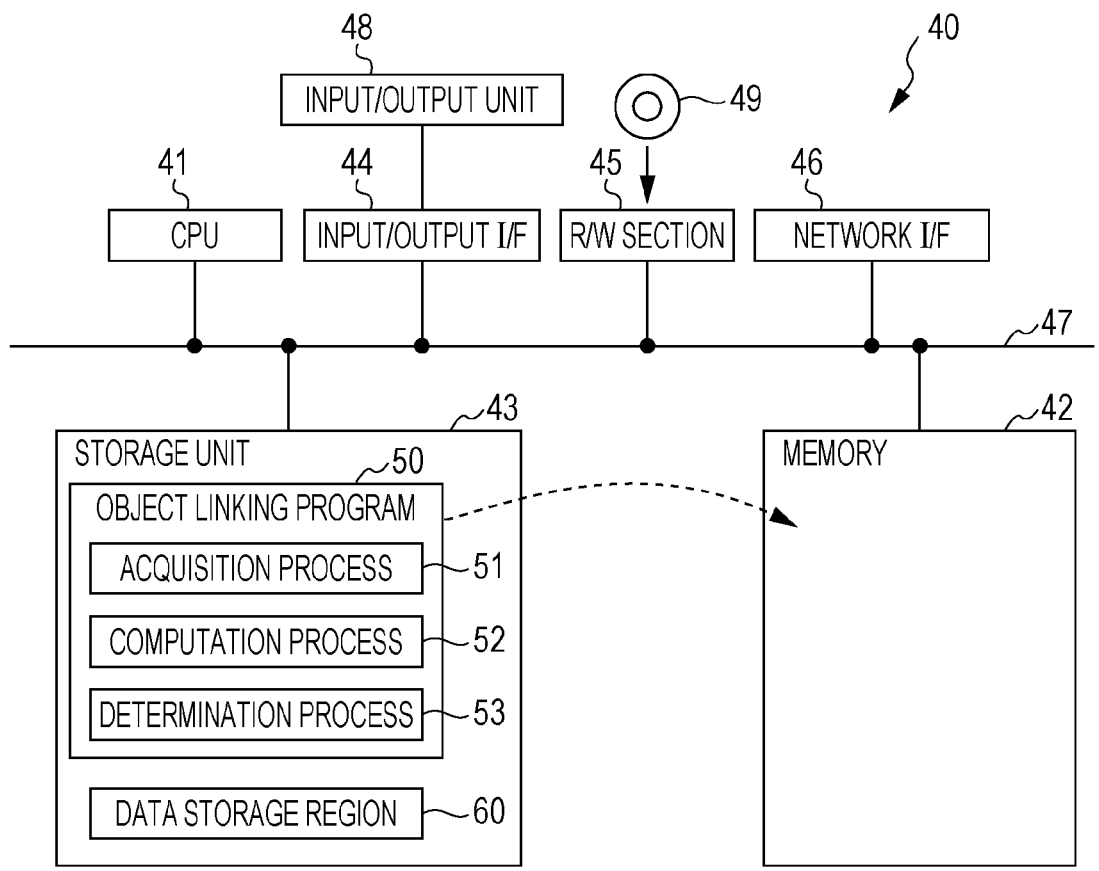
FIG. 19 is a block diagram illustrating a schematic configuration of a computer that functions as an object linking apparatus.

For example, the object linking apparatus 10 can be realized by a computer 40 illustrated in FIG. 19. The computer 40 includes a CPU 41, a memory 42 as a temporary storage region, and a nonvolatile storage unit 43. In addition, the computer 40 includes an input/output interface (I/F) 44 to which an input/output unit 48 such as a display unit and an input unit is connected. In addition, the computer 40 includes read/write (R/W) section 45 that controls reading and writing of data from and to a storage medium 49 and a network I/F 46 which is connected to a network such as Internet. The CPU 41, the memory 42, the storage unit 43, the input/output I/F 44, the R/W section 45, and the network I/F 46 are connected to one another through a bus 47.

The storage unit 43 can be realized by a hard disk drive (HDD), a solid state drive (SSD), a flash memory, or the like. In the storage unit 43 as a storage medium, an object linking program 50 that causes the computer 40 to function as the object linking apparatus 10 is stored. In addition, the storage unit 43 includes a data storage region 60 in which data configuring each of the event history DB 21, the exit list 22, the probability model DB 23, and the certainty factor matrix DB 24 is stored.

The CPU 41 reads the object linking program 50 from the storage unit 43, develops the object linking program in the memory 42, and executes processes contained in the object linking program 50, in order. In addition, the CPU 41 reads data from the data storage region 60 and develops, in the memory 42, each of the event history DB 21, the exit list 22, the probability model DB 23, and the certainty factor matrix DB 24.

The object linking program 50 has an acquisition process 51, a computation process 52, and a determination process 53. The CPU 41 executes the acquisition process 51, and thereby the CPU operates as the acquisition unit 11 illustrated in FIG. 2. In addition, the CPU 41 executes the computation process 52, and thereby the CPU operates as the computation unit 12 illustrated in FIG. 2. In addition, the CPU 41 executes the determination process 53, and thereby the CPU operates as the determination unit 13 illustrated in FIG. 2. The computer 40 that executes the object linking program 50 hereby functions as the object linking apparatus 10.

Further, the object linking apparatus 10 can be realized, for example, by a semiconductor integrated circuit, to be more exact, an application specific integrated circuit (ASIC), or the like.

Next, an operation of the object linking apparatus 10 according to the present embodiment will be described. When the portable terminal 30 carried by the person 31 who appears in the predetermined region is connected to the AP 32, the sensor data processing unit 34 acquires, from the portable terminal 30 through the AP 32, the terminal ID and sensor data detected by the inertial sensor included in the portable terminal 30. The sensor data processing unit 34 generates a state event based on the sensor data and transmits, along with the terminal ID of the corresponding portable terminal 30, the state event to the object linking apparatus 10. In addition, when the portable terminal 30 is disconnected from the AP 32, the sensor data processing unit 34 generates an "exit event" and transmits, along with the terminal ID, the exit event to the object linking apparatus 10.

In addition, the camera 36 images the person 31 present in the predetermined region and outputs the captured camera image (video image). Also, the person tracking unit 38 acquires the camera image output from the camera 36 and performs tracking of the person 31 from the camera image and extracting the moving line. The person tracking unit 38 generates the state event based on the moving line and transmits, along with the moving line ID of the corresponding moving line, the state event to the object linking apparatus 10. Further, when it is not possible to track a region on the camera image, which indicates the person 31, the person tracking unit 38 generates the exit event and transmits, along with the moving line ID, the exit event to the object linking apparatus 10.

Also, in the object linking apparatus 10, the object linking process illustrated in FIG. 20 is executed.

In step S11, the acquisition unit 11 acquires the state event and the exit event transmitted from the sensor data processing unit 34 and the person tracking unit 38, respectively.

Next, in step S21, the acquisition unit 11 stores the acquired state event in the event history DB 21 for each type of object from which the state event is observed. Specifically, the state event of the portable terminal 30 is stored in the event history table 21A for the portable terminal 30 and the state event of the moving line is stored in the event history table 21B for the portable terminal 30. In addition, the acquisition unit 11 stores the terminal ID or the moving line ID acquired along with the exit event in the exit list 22. In step S21, a time point at which the state event is acquired is t(2).

Next, in step S13, the computation unit 12 determines whether or not the state event acquired by the acquisition unit 11 is the state event of the portable terminal 30. In the case of the state event of the portable terminal 30, the process proceeds to step S14 and, in the case of the state event of the moving line, the process proceeds to step S15.

In step S14, the computation unit 12 refers to the event history table 21B for the moving line. Also, the computation unit 12 extracts a state event having the same value as that of the state event of the acquired portable terminal 30, of the state events of the moving line, which are acquired in the time window of the acquisition time t(2).

Meanwhile, in step S15, the computation unit 12 refers to the event history table 21A for the portable terminal 30. Also, the computation unit 12 extracts a state event having the same value as that of the state event of the acquired moving line, of the state events of the portable terminal 30, which are acquired in the time window of the acquisition time t(2).

Here, the state event $o_{h1}$ of the moving line is set to 0 and is acquired at the acquisition time t(2) and, in step S15, the state event $o_{m1}$ of the portable terminal 30, which is set to 0 and is acquired at the acquisition time t(1) which is within the time window of the time t(2), is extracted. Further, the event arrival time difference r in this case is obtained by r=t(2)−t(1).

Next, in step S16, the state event $o_{m1}$ of the portable terminal 30, which is set to 0, and the state event $o_{h1}$ of the moving line, which is set to 0, are temporarily linked and a temporary linking pattern $\{o_{h1}, o_{m1}\}$ is extracted.

Next, in step S17, in a case where the certainty factor matrix for each state is not generated, the computation unit 12 generates a matrix having one row and one column in which h1 is the column and m1 is the row. In a case where the certainty factor matrix is generated in advance, the computation unit 12 adds a column of h1 in a case where the column of h1 is not present in the matrix and the computation unit adds a row of m1 in a case where the row of m1 is not present. Further, the computation unit 12 adds a row of a virtual object m $^{-}$1 with respect to the generated or added column h1 and adds a column of a virtual object h _1 with respect to the generated or added row m1. The computation unit 12 sets a value of an element of the generated or added row or column to "1.0" as an initial value.

Figures 8, 9:
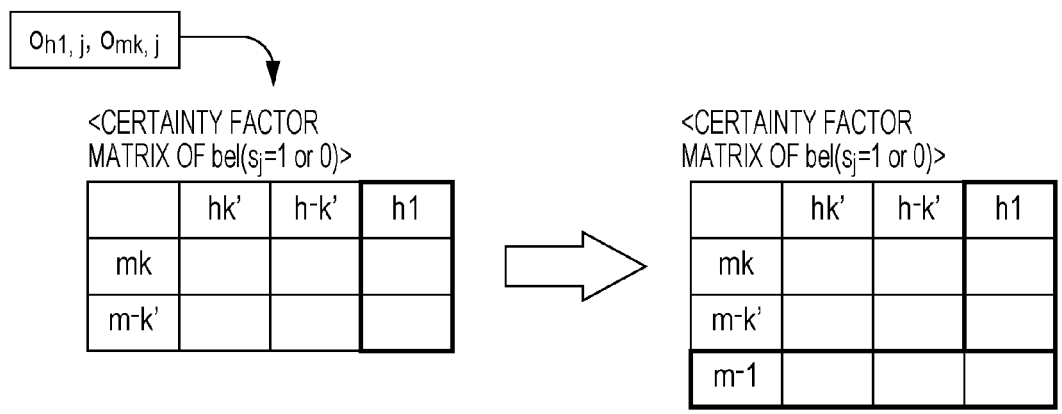
FIG. 8 is a diagram illustrating a renewal of a shape of the certainty matrix.
FIG. 9 is a diagram illustrating a target element of a certainty renewal.

Next, in step S18, as illustrated in FIG. 9, the computation unit 12 computes the certainty factor of the renewal target determined from the temporary linking pattern by Expression (3). Here, the certainty factor $bel(s_{t(2)})$ corresponding to the column of h1 and the row of m1 is computed. Further, the certainty factor $bel(s_{t(1)}=0)$ computed at time t(1) is set to 0.5, the certainty factor $bel(s_{t(1)}=1)$ computed at time t(1) is set to 0.5, and the values are stored as a value of an element corresponding to the column of h1 and the row of m1 of the certainty factor matrix before the renewal.

Specifically, the computation unit 12 acquires the probability p $(s_{t(2)}|s_{t(1)}=0)=0.5$ that transition from $s_{t(1)}=0$ (stopping) to $s_{t(2)}=1$ (moving) is performed at bel $(s_{t(2)}=1)$, from the state transition probability model 23A. In addition, the computation unit 12 acquires the probability p $(s_{t(2)}|s_{t(1)}=1)=0.5$ that transition from $s_{t(1)}=1$ (moving) to $s_{t(2)}=1$ is performed.

In addition, the computation unit 12 refers to a <stopping to moving> table of the observation probability model 23B. Also, the computation unit 12 acquires the observation probability p $(o_h|s_{t(1)}=0 \rightarrow s_{t(2)})=0.05$ and p $(o_m|s_{t(1)}=0 \rightarrow s_{t(2)})=0.05$ corresponding to "stopping" of the event, for each of the "moving line" and "portable terminal" as the objects. In addition, the computation unit 12 refers to a <moving to moving> table of the observation probability model 23B. Also, the computation unit 12 acquires the observation probability p $(o_h|s_{t(1)}=1 \rightarrow s_{t(2)})=0.05$ and p $(o_m|s_{t(1)}=1 \rightarrow s_{t(2)})=0.1$ corresponding to "stopping" of the event, for each of the "moving lines" and "portable terminals" as the objects.

Further, the computation unit 12 acquires the probability $p(r)=N$ $(r_{\overline{00}}, \Sigma r_{00})$ that the event arrival time difference between the "stopping $(o_h=0)$" and "stopping $(o_{m(r)}=0)$" is r, from a table <in a case where the state event of the moving line is acquired> of the arrival time difference probability model 23C.

The computation unit 12 substitutes the respective acquired probabilities to Expression (3) and computes bel $(s_{t(2)}=1)$ as will be exhibited in the following Expression (8).

$$bel(s_{t(2)} = 1) = \eta p(r)p(0 \mid 0 \rightarrow 1)p(0 \mid = 0 \rightarrow 1)p(1 \mid 0)bel(0) + \\ \eta p(r)p(0 \mid 1 \rightarrow 1)p(0 \mid 1 \rightarrow 1)p(1 \mid 1)bel(1) \\ = \eta * N\left(\bar{r}_{00}, \sum_{r_{00}}\right)(0.05*0.05*0.5*0.5 + 0.05*0.1*0.5*0.5) \\ = \eta * N\left(\bar{r}_{00}, \sum_{r_{00}}\right)*0.001875$$

(8)

Similarly, the computation unit 12 acquires, from the state transition probability model 23A, the probability p $(s_{t(2)}|s_{t(1)}=0)=0.5$ that transition from $s_{t(1)}=0$ (stopping) to $s_{t(2)}=0$ (stopping) is performed at bel$(s_{t(2)}=0)$. In addition, the computation unit 12 acquires the probability p $(s_{t(2)}|s_{t(1)}=0)=0.5$ that transition from $s_{t(1)}=1$ (moving) to $s_{t(2)}=0$ is performed.

In addition, the computation unit 12 refers to a <stopping to stopping> table of the observation probability model 23B. Also, the computation unit 12 acquires the observation probability p $(o_h|s_{t(1)}=0 \rightarrow s_{t(2)})=0.1$ and p $(o_m|s_{t(1)}=0 \rightarrow s_{t(2)})=0.2$ corresponding to "stopping" of the event, for each of the "moving line" and "portable terminal" as the objects. In addition, the computation unit 12 refers to a <moving to stopping> table of the observation probability model 23B. Also, the computation unit 12 acquires the observation probability p $(o_h|s_{t(1)}=1 \rightarrow s_{t(2)})=0.9$ and p $(o_m|s_{t(1)}=1 \rightarrow s_{t(2)})=0.8$ corresponding to "stopping" of the event, for each of the "moving lines" and "portable terminals" as the objects.

Further, the computation unit 12 acquires the probability $p(r)=N$ $(r_{\overline{00}}, \Sigma_{r00})$ that the event arrival time difference between the "stopping $(o_h=0)$" and "stopping $(o_{m(r)}=0)$" is r, from a table <in a case where the state event of the moving line is acquired> of the arrival time difference probability model 23C.

The computation unit 12 substitutes the respective acquired probabilities to Expression (3) and computes bel $(s_{t(2)}=0)$ as will be exhibited in the following Expression (9).

$$bel(s_{t(2)} = 0) = \eta p(r)p(0 \mid 0 \rightarrow 0)p(0 \mid = 0 \rightarrow 0)p(0 \mid 0)bel(0) + \\ \eta p(r)p(0 \mid 1 \rightarrow 0)p(0 \mid 1 \rightarrow 0)p(0 \mid 1)bel(1) \\ = \eta * N\left(\bar{r}_{00}, \sum_{r_{00}}\right)(0.1*0.2*0.5*0.5 + 0.9*0.8*0.5*0.5) \\ = \eta * N\left(\bar{r}_{00}, \sum_{r_{00}}\right)*0.185$$

(9)

In step S16 described above, in a case where a plurality of temporary linking patterns are extracted, steps S17 and S18 described above are repeated for each of the temporary linking patterns.

Next, in step S19, the determination unit 13 compares the values (certainty factors) of the elements in the same row and column from the certainty factor matrix for each state, picks out a greater value, and converts the value to a negative opposite. The determination unit 13 sets the converted value as a linking score and puts the value in each element of the same row and column of the linking score matrix. The determination unit 13 stores the linking score matrix in the certainty factor matrix DB 24.

Next, in step S20, the determination unit 13 obtains the sum of the linking scores for the combination in which the one-to-one linking between the object (portable terminal 30) corresponding to the row and the object (moving line) corresponding to the column of the linking score matrix. Also, the determination unit 13 extracts the combination $H_1$ of the linking having the greatest sum of the linking scores and the combination $H_2$ of the linking having the second greatest sum. The sum of the linking scores of the combination $H_1$ of the linking is $S(H_1)$ and the sum of the linking scores of the combination $H_2$ of the linking is $S(H_2)$.

Next, in step S21, the determination unit 13 determines whether or not $S(H_1)-S(H_2)>Th$ (threshold value). In the case of $S(H_1)-S(H_2)>Th$, the process proceeds to step S22 and the determination unit 13 outputs $H_1$ as a linking result of the object. In a case of $S(H_1)-S(H_2) \leq Th$, the process skips step S22.

Next, in step S23, the determination unit 13 determines whether or not the terminal ID or the moving line ID is stored in the exit list 22. In a case where the terminal ID or the moving line ID is stored in the exit list, the process proceeds to step S24. In step S24, the determination unit 13 removes the row and the column corresponding to the terminal ID or the moving line ID which is stored in the exit list 22 from each of the certainty factor matrixes for each state and removes the column or the row of the virtual object with respect to the object of the row or the column. Also, the determination unit 13 removes, from the exit list 22, the terminal ID or the moving line ID, from which the row and the column of the certainty factor matrix are removed. In a case where the terminal ID or the moving line ID is not stored in the exit list 22, the process skips step S24.

Next, in step S25, it is determined whether or not an end instruction of the object linking process is received. In a case where the end instruction is not received, the process returns to step S11 and, in a case where the end instruction is received, the object linking process ends.

As described above, in the object linking apparatus according to the present embodiment, since another type of virtual object corresponding to the one type of object is included, one-to-one linking between different types of objects is performed. In order to perform the one-to-one linking between different types of objects, the square matrix, in which the one type of object corresponds to the row and the other type of object corresponds to the column, is used. Also, the linking degree between the different types of objects is computed as a value of each element of the square matrix. Therefore, in consideration of a case where the state event of the one type of object is observed but a state event of the other type of object is not observed, it is possible to determine the linking and it is possible to improve the linking accuracy between the different types of objects.

In addition, when the certainty factor is computed, the uncertainty with respect to the observation of the state event is probabilistically presented. Therefore, it is possible to improve the linking accuracy between the different types of objects.

In addition, since the linking score of the combination of the linking between the different types of objects is optimized and the linking result is determined, it is possible to improve the linking accuracy between the different types of objects.

Further, in the present embodiment, a case where two states of "moving" and "stopping" are presented as the states of a person is described; however, three or more states may be presented. In this case, the certainty factor matrixes for each state may be prepared by the number of the presented states. In addition, a parameter according to the number of states may be provided for each of the state transition probability model 23A, the observation probability model 23B, and the arrival time difference probability model 23C. In addition, an integrating expression of the certainty factor bel ($S_{t(n)}$) illustrated in Expression (3) is also a combination of $S_{t(n-1)}$ and $S_{t(n)}$; however, modification may be performed such that all the combinations of two states of the three or more states are contained.

Further, as described above, a mode in which the object linking program 50 is stored (installed) in the storage unit 43 in advance is described; however, the configuration is not limited thereto. The object linking program according to the technology of the disclosure may be provided as a mode of being stored in a recording medium such as a CD-ROM, a DVD-ROM, or a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An object linking method comprising:
    detecting each of at least one first object based on a video image, each of the at least one first object having each first state that is one of states including a moving state and a stopping state;
    detecting each of at least one second object based on each data measured by each inertial sensor in each of the at least one second object, each of the at least one second object having each second state that is one of states including a moving state and a stopping state; and
    linking, by a computer, each of the at least one first object and each of the at least one second object in one-to-one, based on each first change of each first state and each second change of each second state, wherein
    when a specified first object of the at least one first object is not linked to any of the at least one second object, the specified first object is linked to a virtual second object that is added to the at least one second object, and
    when a specified second object of the at least one second object is not linked to any of the at least one first object, the specified second object is linked to a virtual first object that is added to the at least one first object.

2. The object linking method according to claim 1, wherein
    the linking of each of the at least one first object and each of the at least one second object in one-to-one is based on a square matrix, each row of the square matrix corresponding to each of the at least one first object to which the virtual first object is added when each column of the square matrix corresponding to each of the at least one second object to which the virtual second object is added, each column of the square matrix corresponding to each of the at least one first object to which the virtual first object is added when each row of the square matrix corresponding to each of the at least one second object to which the virtual second object is added.

3. The object linking method according to claim 2, further comprising:
    deleting, when a first object become undetected, the undetected first object and a second object or a virtual second object corresponding to the undetected first object from the square matrix, and
    deleting, when a second object become undetected, the undetected second object and a first object or a virtual first object corresponding to the undetected second object from the square matrix.

4. The object linking method according to claim 1, wherein
    the linking of each of the at least one first object and each of the at least one second object in one-to-one is based on each certainty factor that is given to each of combinations of each of the at least one first object and each of the at least one second object based on each first change of each first state and each second change of each second state.

5. The object linking method according to claim 4, wherein
    each certainty factor of each of event pairs of each first event and each second event is calculated based on a specified probability model, each first event relating to each change of each first state of each first object of each of the event pairs, each second event relating to each change of each second state of each second object of each of the event pairs, each first event and each second event being detected within a specified time window.

6. The object linking method according to claim 5, wherein
    each certainty factor is calculated based on a first undetected event when a first event is undetected, and each certainty factor is calculated based on a second undetected event when a second event is undetected.

7. The object linking method according to claim 5, wherein
the specified probability model is based on each difference between each first time in which each first event is detected and each second time in which each second event is detected.

8. The object linking method according to claim 5, wherein
the specified probability model is based on each difference between each first time in which each first event is detected and each second time in which each second event is detected, and
when one of a first event and a second event is undetected, a difference of the first event and the second event is obtained based on uniform distribution within the specified time window.

9. The object linking method according to claim 8, wherein
the specified probability model includes each probability of each transition of each first event and each second event.

10. The object linking method according to claim 5, wherein
the specified probability model estimates each of subsequent first events and each of subsequent second events based on each probability of each transition of each first event and each second event,
the subsequent first events include a first undetected event, and
the subsequent second events include a second undetected event.

11. The object linking method according to claim 5, further comprising:
selecting a first combination of each of object pairs of each first object and each second object from combination candidates of each of the object pairs so that a first sum of certainty factors of the first combination of each of the object pairs is the greatest in the combination candidates, wherein
the linking of each of the at least one first object and each of the at least one second object in one-to-one is based on the first combination of each of object pairs.

12. The object linking method according to claim 11, further comprising:
selecting a second combination of each of object pairs of each first object and each second object from combination candidates of each of the object pairs so that a second sum of certainty factors of the second combination of each of the object pairs is the second greatest in the combination candidates, wherein
the linking of each of the at least one first object and each of the at least one second object in one-to-one is based on the first combination of each of object pairs when a difference between the first sum and the second sum is greater than a specified value.

13. The object linking method according to claim 1, wherein
each of the at least one first object is each person, and
each of the at least one second object is each device carried by each person.

14. An object linking apparatus comprising:
a memory; and
a processor coupled to the memory and configured to:
detect each of at least one first object based on a video image, each of the at least one first object having each first state that is one of states including a moving state and a stopping state,
detect each of at least one second object based on each data measured by each inertial sensor in each of the at least one second object, each of the at least one second object having each second state that is one of states including a moving state and a stopping state, and
link each of the at least one first object and each of the at least one second object in one-to-one, based on each first change of each first state and each second change of each second state, wherein
when a specified first object of the at least one first object is not linked to any of the at least one second object, the specified first object is linked to a virtual second object that is added to the at least one second object, and
when a specified second object of the at least one second object is not linked to any of the at least one first object, the specified second object is linked to a virtual first object that is added to the at least one first object.

15. A non-transitory computer-readable storage medium storing a program that causes a computer to execute a process, the computer including a memory, the process comprising:
detecting each of at least one first object based on a video image, each of the at least one first object having each first state that is one of states including a moving state and a stopping state;
detecting each of at least one second object based on each data measured by each inertial sensor in each of the at least one second object, each of the at least one second object having each second state that is one of states including a moving state and a stopping state; and
linking each of the at least one first object and each of the at least one second object in one-to-one, based on each first change of each first state and each second change of each second state, wherein
when a specified first object of the at least one first object is not linked to any of the at least one second object, the specified first object is linked to a virtual second object that is added to the at least one second object, and
when a specified second object of the at least one second object is not linked to any of the at least one first object, the specified second object is linked to a virtual first object that is added to the at least one first object.

* * * * *